(12) United States Patent
Deogun et al.

(10) Patent No.: US 11,979,902 B2
(45) Date of Patent: May 7, 2024

(54) DATA SCHEDULING IN UPLINK BURST

(71) Applicant: QUALCOMM Incorporated, San Diego, CA (US)

(72) Inventors: Pravjyot Singh Deogun, Bangalore (IN); Kapil Bhattad, Bangalore (IN); Jing Sun, San Diego, CA (US); Xiaoxia Zhang, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/922,448

(22) Filed: Jul. 7, 2020

(65) Prior Publication Data

US 2021/0014874 A1   Jan. 14, 2021

(30) Foreign Application Priority Data

Jul. 10, 2019 (IN) .............................. 201941027615

(51) Int. Cl.
*H04W 72/566* (2023.01)
*H04W 72/1268* (2023.01)
*H04W 72/23* (2023.01)
*H04W 74/0808* (2024.01)

(52) U.S. Cl.
CPC ..... *H04W 72/569* (2023.01); *H04W 72/1268* (2013.01); *H04W 72/23* (2023.01); *H04W 74/0808* (2013.01)

(58) Field of Classification Search
CPC ......... H04W 72/1242; H04W 72/1268; H04W 72/14; H04W 74/0808
See application file for complete search history.

(56) References Cited

U.S. PATENT DOCUMENTS

| 2006/0262810 | A1* | 11/2006 | Vadakital | H03M 13/1515 370/473 |
| 2011/0141983 | A1* | 6/2011 | Hong | H04W 28/0278 370/329 |
| 2014/0105009 | A1* | 4/2014 | Vos | H04L 47/2475 370/230 |
| 2016/0278048 | A1* | 9/2016 | Nory | H04L 27/0006 |
| 2017/0013565 | A1* | 1/2017 | Pelletier | H04W 52/367 |
| 2019/0090245 | A1* | 3/2019 | Ansari | H04W 72/0486 |

(Continued)

OTHER PUBLICATIONS

International Search Report and Written Opinion—PCT/US2020/041261—ISA/EPO—dated Sep. 21, 2020.

(Continued)

*Primary Examiner* — Kevin M Cunningham
(74) *Attorney, Agent, or Firm* — Patterson & Sheridan, L.L.P/Qualcomm Incorporated

(57) ABSTRACT

Certain aspects of the present disclosure provide techniques for high priority data scheduling in uplink bursts. Aspects provide a method that may be performed by a user equipment (UE). The method generally includes receiving one or more uplink grants scheduling a plurality of transmission occasions for the UE. The method generally includes performing a listen-before-talk (LBT) procedure to attempt to acquire a channel for transmitting in at least one of the plurality of transmission occasions. The method generally includes determining one or more of the plurality of transmission occasions to transmit data based, at least in part, on the LBT procedure.

24 Claims, 8 Drawing Sheets

(56) References Cited

U.S. PATENT DOCUMENTS

| | | | | |
|---|---|---|---|---|
| 2019/0327117 A1* | 10/2019 | Jeon | ............... | H04L 5/0044 |
| 2020/0107365 A1* | 4/2020 | Tsai | ............... | H04W 74/0833 |
| 2020/0267749 A1* | 8/2020 | Al-Imari | ............... | H04L 5/0044 |
| 2020/0404655 A1* | 12/2020 | Salem | ............... | H04W 72/042 |
| 2021/0235491 A1* | 7/2021 | Iyer | ............... | H04W 72/1268 |
| 2022/0104185 A1* | 3/2022 | Moon | ............... | H04L 1/0072 |

OTHER PUBLICATIONS

NTT Docomo, Inc: "HARQ Enhancement for NR-U", 3GPP TSG RAN WG1 #96, 3GPP Draft, R1-1902791_HARQ Enhancement for NR-U Final, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600486, 6 Pages, Retrieved from the Internet: URL: http://www.3gpp.org/ftp/tsg%5Fran/WG1%5FRL1/TSGR1%5F96/Docs/R1%2D1902791%2Ezip [retrieved on Feb. 15, 2019] Section 2.4, p. 5.

Sharp: "UL Signals and Channels for NR-U", 3GPP Draft, R1-1904872, 3GPP TSG RAN WG1 #96b Meeting, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 7, 2019 (Apr. 7, 2019), XP051700019, 8 Pages, Retrieved from the Internet: URL: http://www.3gpp.org/ftp/Meetings%5F3GPP%5FSYNC/RAN1/Docs/R1%2D1904872%2Ezip [retrieved on Apr. 7, 2019] Section 5.1, p. 6-p. 7.

\* cited by examiner

DATA SCHEDULING IN UPLINK BURST

CROSS-REFERENCE TO RELATED APPLICATION(S)

This application claims benefit of and priority to Indian Provisional Application No. 201941027615, filed Jul. 10, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for data scheduling.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved transmission of data.

Certain aspects provide a method for wireless communication by a user equipment (UE). The method generally includes receiving one or more uplink grants scheduling a plurality of transmission occasions for the UE. The method generally includes performing a listen-before-talk (LBT) procedure to attempt to acquire a channel for transmitting data in at least one of the plurality of transmission occasions. The method generally includes determining one or more of the plurality of transmission occasions for transmitting data based, at least in part, on the LBT procedure.

Certain aspects provide an apparatus for wireless communication. The apparatus generally includes at least one processor and a memory coupled to the at least one processor. The memory generally includes code executable by the at least one processor to cause the apparatus to receive one or more uplink grants scheduling a plurality of transmission occasions for the apparatus; perform a LBT procedure to attempt to acquire a channel for transmitting data in at least one of the plurality of transmission occasions; and determine one or more of the plurality of transmission occasions for transmitting data based, at least in part, on the LBT procedure.

Certain aspects provide an apparatus for wireless communication. The apparatus generally includes means for receiving one or more uplink grants scheduling a plurality of transmission occasions for the apparatus. The apparatus generally includes means for performing a LBT procedure to attempt to acquire a channel for transmitting data in at least one of the plurality of transmission occasions. The apparatus generally includes means for determining one or more of the plurality of transmission occasions for transmitting data based, at least in part, on the LBT procedure.

Certain aspects provide a computer readable medium. The computer readable generally stored computer executable code thereon for wireless communication. The computer readable medium generally includes code for receiving one or more uplink grants scheduling a plurality of transmission occasions for the apparatus. The computer readable medium generally includes code for performing a LBT procedure to attempt to acquire a channel for transmitting data in at least one of the plurality of transmission occasions. The computer readable medium generally includes code for determining one or more of the plurality of transmission occasions for transmitting data based, at least in part, on the LBT procedure.

Aspects of the present disclosure provide means for, apparatus, processors, and computer-readable mediums for performing techniques and methods that may be complementary to the operations by the UE described herein, for example, by a base station (BS).

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
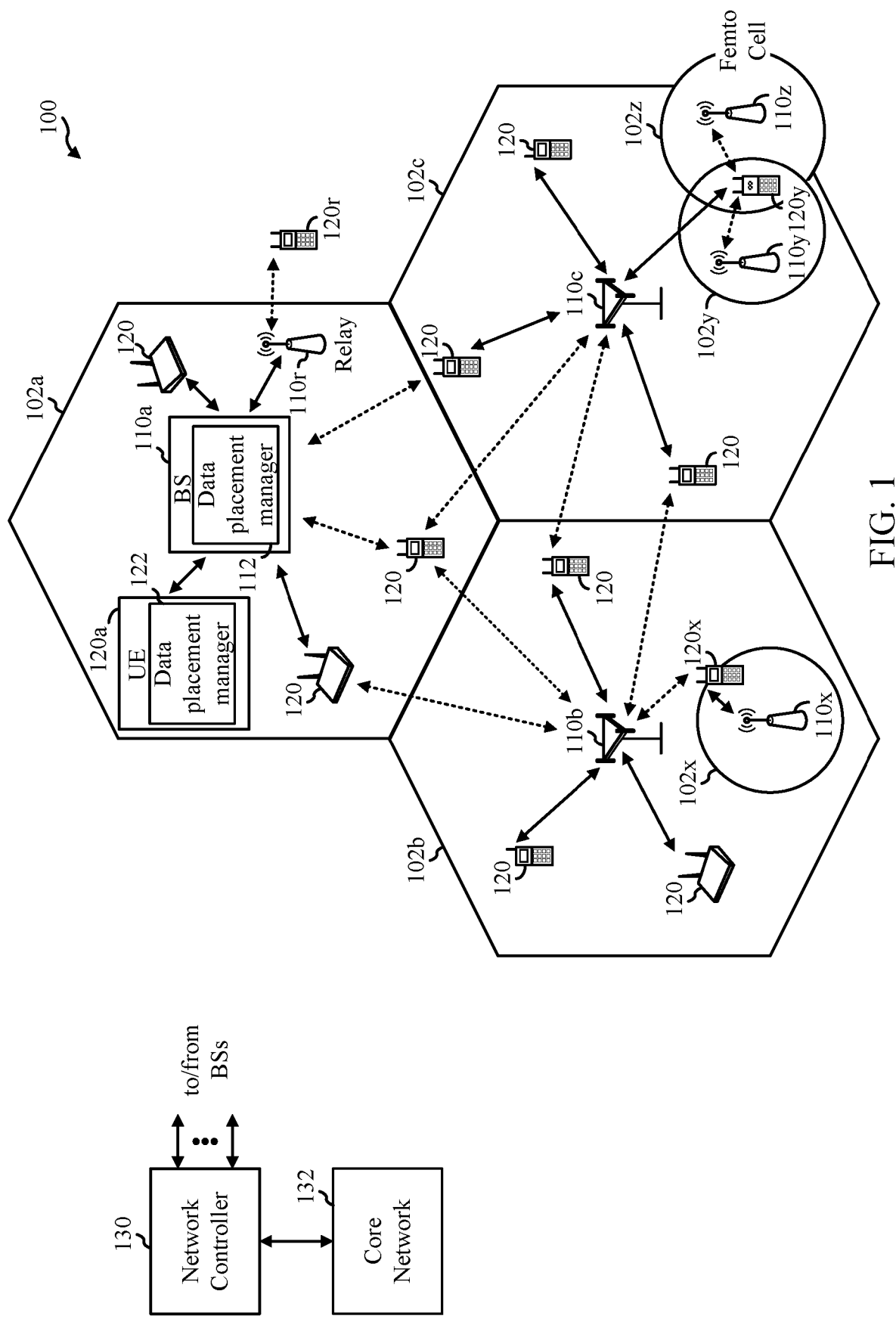
FIG. 1 is a block diagram conceptually illustrating an example telecommunications system, in accordance with certain aspects of the present disclosure.

Aspects of the present disclosure provide apparatus, methods, processing systems, and computer readable mediums for data scheduling in uplink burst.

In certain systems, a user equipment (UE) can be scheduled for multiple transmission occasions. For example, a UE may be scheduled for an uplink burst. An uplink burst may correspond to uplink transmissions in multiple consecutive transmission occasions. In certain systems (e.g., Rel-15 5G NR), data, such as high priority data, is transmitted in the earliest available grant. In some cases; however, it may be desirable to place the data in a later transmission occasion than the earliest scheduled grant. For example, the UE may not acquire the channel for the earliest scheduled grant, such as when a listen-before-talk (LBT) procedure fails.

Aspects of the present disclose provide techniques and apparatus for flexible placement of data.

The following description provides examples of data scheduling in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for high priority data placement in uplink bursts. As shown in FIG. 1, the UE 120a includes a data placement manager 122. The data placement manager 122 may be configured to flexibly determine one or more of the transmission occasions for transmitting data, in accordance with aspects of the present disclosure. The BS 110a has a data placement manager 112 that may perform complementary operations to those performed by the UE 120a.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
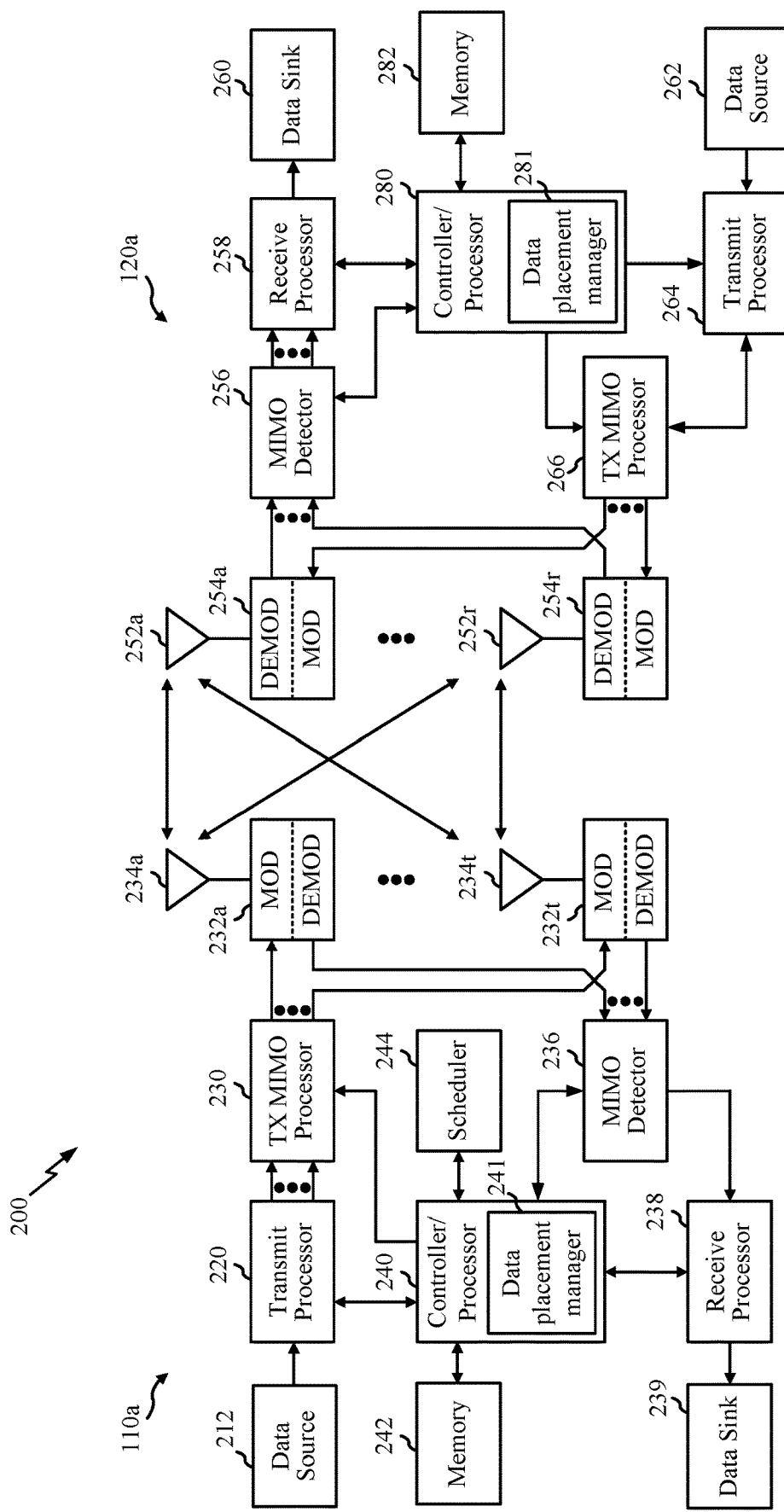
FIG. 2 is a block diagram conceptually illustrating a design of an example base station (BS) and UE, in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has a data placement manager 281 that may be configured for flexible data placement, according to aspects described herein. The controller/processor 240 of the BS 110a may have a data placement manager 241 that may be configured to perform complementary operations to the operations by the UE 110a, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
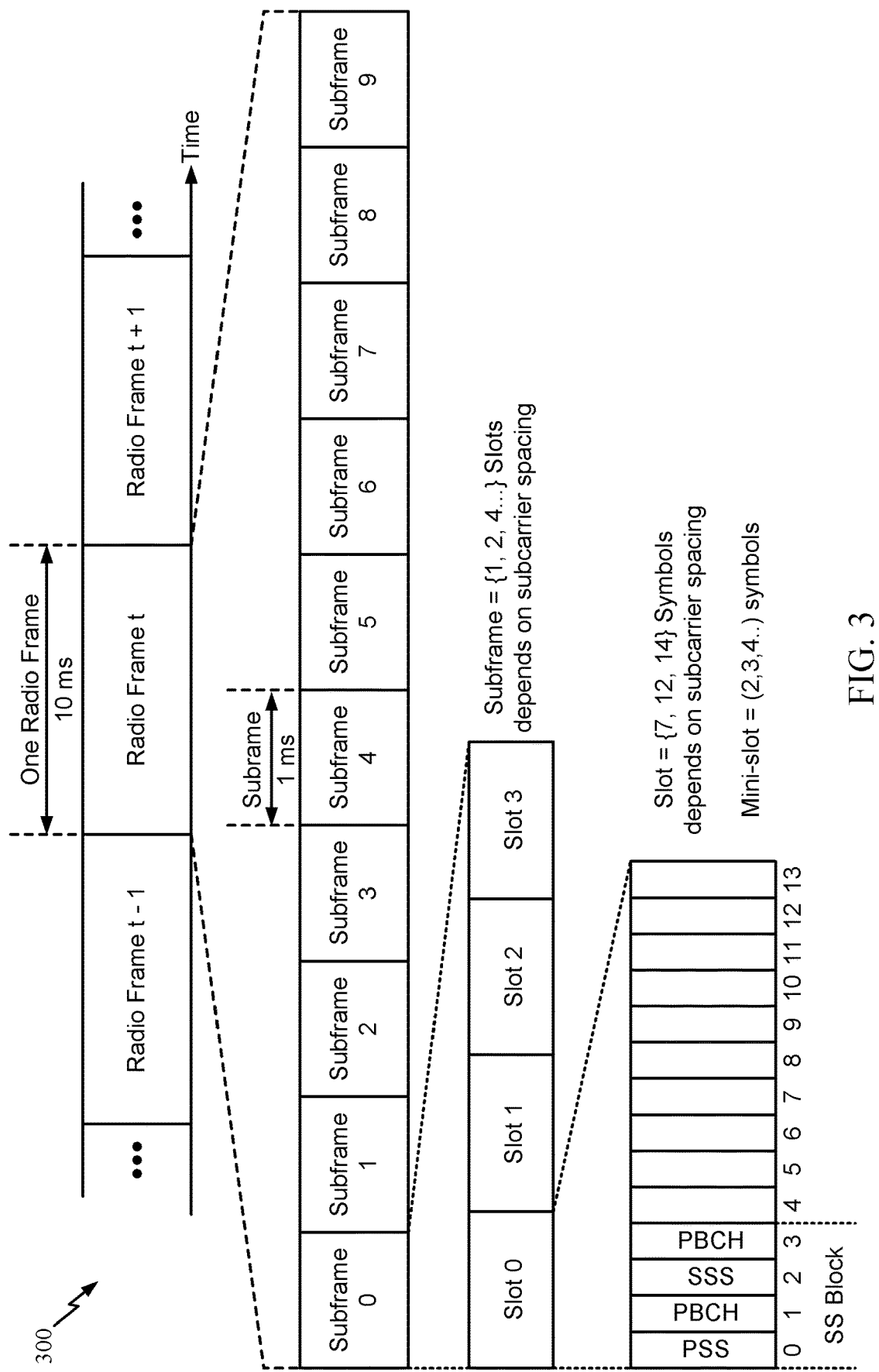
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

As discussed above, aspects of the disclosure relate to data placement.

In certain systems, the UE (e.g., UE 120a) is scheduled with multiple transmission occasions. For example, the UE may be scheduled with an uplink burst. The uplink burst may include multiple consecutive transmission occasions. In some examples, such as in new radio unlicensed (NR-U) systems, the UE may be scheduled by a multi-TTI (multiple transmission time interval) grant for the transmission occasions (e.g., via a single downlink control information (DCI)). In some examples, the UE may be scheduled by multiple separate DCIs (e.g., multiple uplink grants) for the transmission occasions. Each transmission occasion may have a fixed association with a HARQ (hybrid automatic repeat request) process, such as with a HARQ process ID (identifier). For example, a grant (e.g., grant-1) may be associated with a first HARQ process ID (e.g., HARQ$_X$), another grant (e.g., grant-2) may be associated with a second HAR process ID (e.g., HARQ$_{X+1}$), and so on.

The UE prepares the data, for example, by generating medium access control (MAC) protocol data units (PDUs). Each of the PDUs may be for a HARQ process associated with an UL grant.

In certain systems (e.g., Rel-15 5G NR), certain data are transmitted in the earlier grant (e.g., the earliest available grant, such as the soonest TTI of multi-TTI grant). In some examples, high priority data, such as low latency data (e.g., ultra-reliable low-latency (URLLC) data) and/or MAC control element (CE) data is transmitted in an earliest grant. In some examples, the data is placed in the earliest grant according to a logical channel prioritization procedure (e.g., such as the logical channel prioritization procedure in TS 38.321, Section 5.4.3.1 of the 3GPP standards). In an illustrative example, if HARQ process=Y is scheduled earliest, then UE tries to include highest priority data in HARQ process=Y.

In some cases, however, it may be desirable to place the data in a later transmission occasion than the earliest scheduled grant (transmission occasion). For example, in certain systems (such as NR-U), the UE may first contend for access to acquire the channel to transmit the data in a transmission occasion (e.g., a slot), such as by performing a listen-before-talk (LBT) procedure. With LBT, the UE may "sense" the communication channel to find out there is no communications before transmitting on the channel. When the communication channel is a wide bandwidth unlicensed carrier, the "channel sensing" procedure may rely on detecting the energy level on subbands of the communications channel. The LBT parameters, such as type, duration, clear channel assessment (CCA) parameters, and the like, may be configured at the UE by the BS. The LBT procedure may fail for one or more of the transmission occasions and the UE cannot send the data in those transmission occasions. Thus, if the UE places the data in the earliest granted transmission occasions but the UE does not yet have access to the channel (e.g., LBT fails), then the UE may miss transmitting the data.

Figure 4:
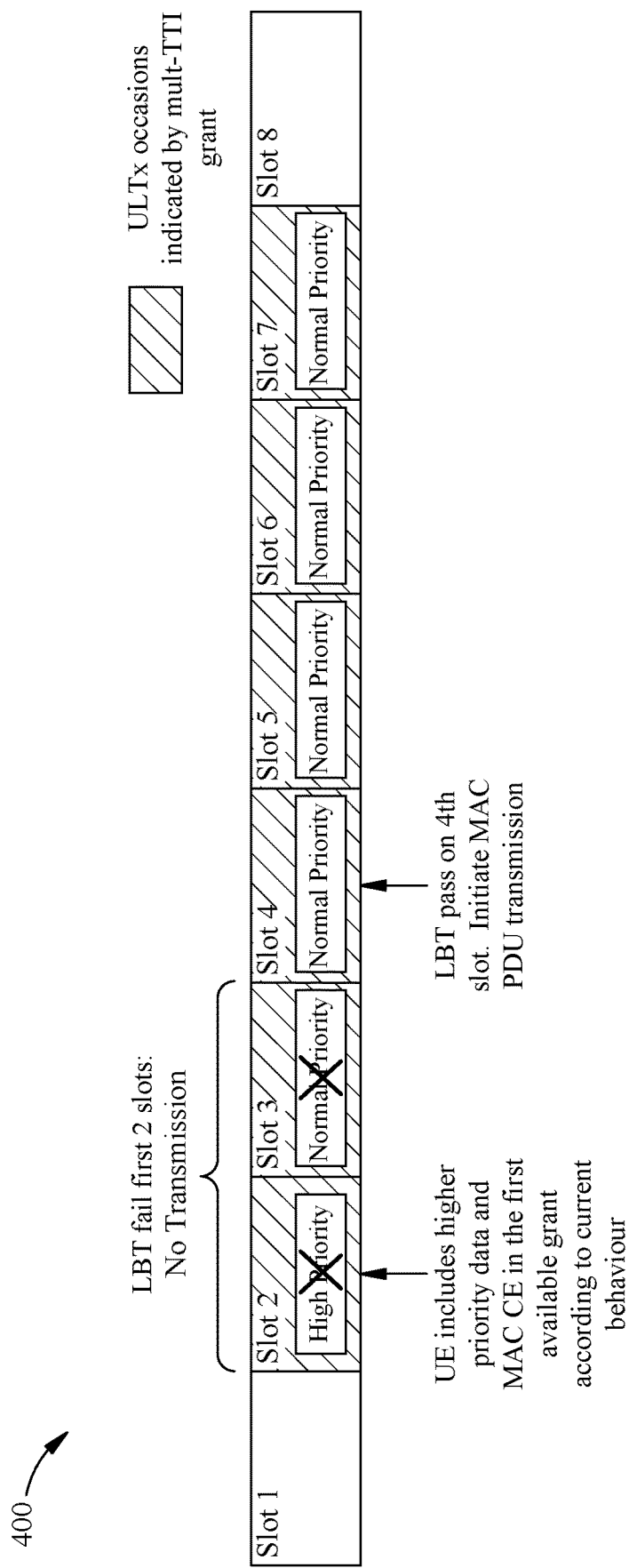
FIG. 4 is a block diagram illustrating example missed transmission of high priority data due to listen-before-talk failure.

FIG. 4 is a block diagram 400 illustrating example missed transmission of data due to LBT failure. As shown in FIG.

4, slots 2-7 may be scheduled (e.g., indicated by a multi-TTI grant). The UE may place data (e.g., high priority and/or MAC CE data) in the earliest available slot, slot 2, and other data (e.g., "normal" priority data) in the remaining scheduled slots 3-7. The UE may perform an LBT procedure to acquire the channel for transmitting data. The LBT may fail for slots 2 and 3, and pass on slot 4. Thus, the UE may miss transmission of the data in slots 2 and 3, and initiate transmission for the slots 4-7.

The network can schedule retransmission of the failed packets, but it will cause additional delay which may not be acceptable to higher priority and/or low latency packets.

Accordingly, what is needed are techniques and apparatus for flexible data placement.

Example Data Scheduling in Uplink Burst

Aspects of the present disclosure provide techniques and apparatus for high priority data placement in uplink bursts. According to certain aspects, a user equipment (UE) can flexibly determine where to place the data (e.g., in which transmission occasion (TO) to transmit the data). The determination may be based on whether the UE has acquired the channel. The determination may be based on a priority of the data. In some examples, the UE includes data in a latter part of an uplink burst, which may have a higher probability of successful transmission that an earlier part of the uplink burst.

Figure 5:
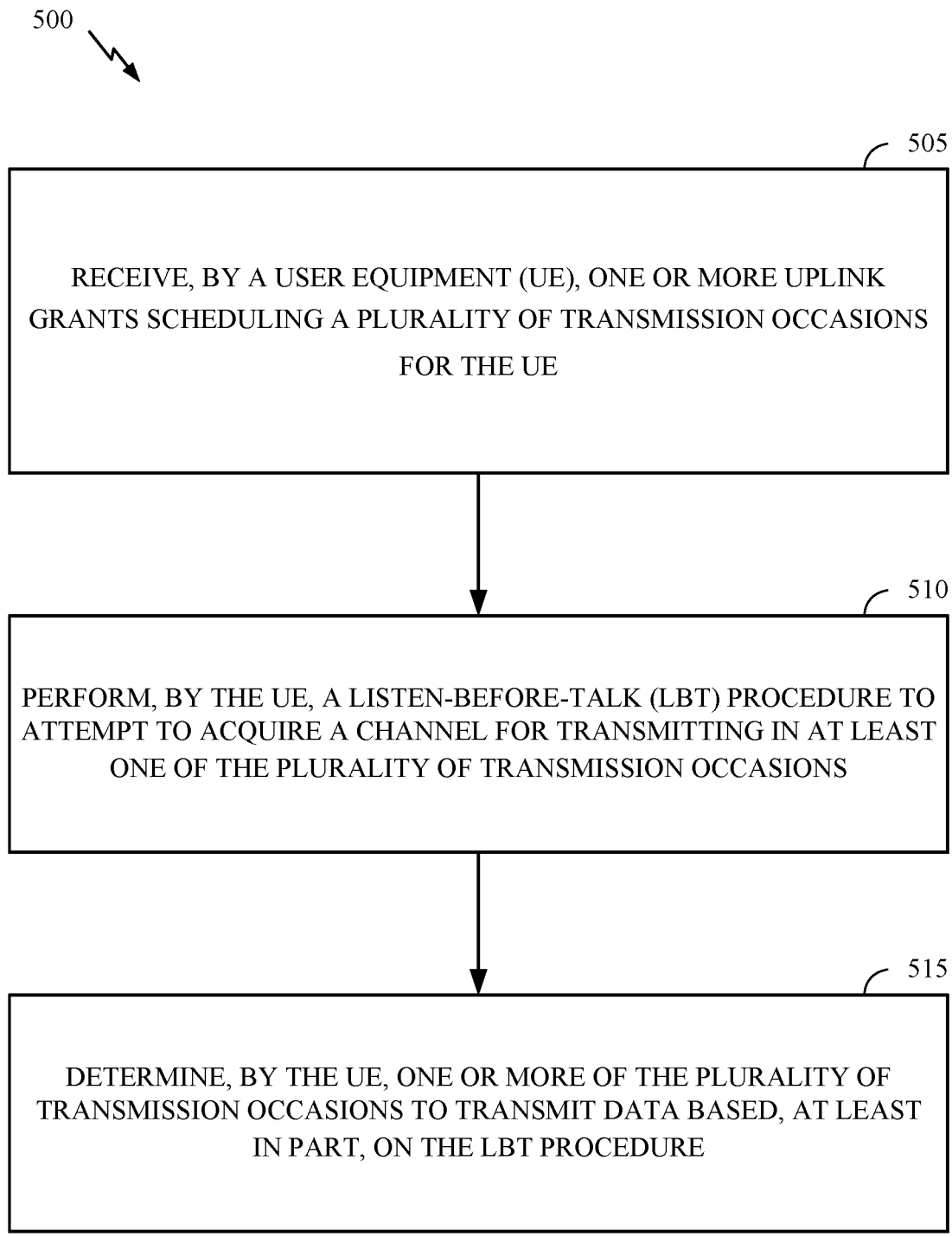
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 120a in the wireless communication network 100). Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at 505, by receiving one or more uplink grants scheduling a plurality of transmission occasions for the UE. In some examples, the plurality of transmission occasions is scheduled by one or more multiple transmission time interval (multi-TTI) grants. For example, the UE may receive a single downlink control information (DCI) scheduling multiple consecutive transmission occasions (e.g., multiple consecutive slots). In some examples, the UE may receive multiple DCIs each with an uplink grant. Each grant (and/or each transmission occasion) may be associated with a hybrid automatic repeat request (HARQ) process. For example, the uplink grants and/or transmissions occasions may be associated with a HARQ identifier (ID).

At 510, the UE performs a listen-before-talk (LBT) procedure to attempt to acquire a channel for transmitting data in at least one of the plurality of transmission occasions. For example, the UE may sense the communication channel to determine whether other devices are transmitting on the channel. If other devices are communicating on the channel, the LBT procedure may "fail". When the LBT fails, the UE may not use the transmission occasion for transmission. When the UE senses that the channel is not be used by other devices, then the LBT procedure may "pass" and the UE may transmit in the transmission occasion.

At 515, the UE determines one or more of the transmission occasions to transmit data (e.g., MAC CE, URLLC, high priority data, and/or other data) based, at least in part, on the LBT procedure. For example, the UE may flexibly determine the one or more transmission occasions to transmit the data based on whether the LBT procedure passes or fails for the sensed channel in the transmission occasions.

According to certain aspects, the flexibly determining the one or more transmission occasions includes determining a transmission occasion other than an earliest one of the transmission occasions for transmitting the data (e.g., for transmitting at least MAC CE and/or high priority data). In some examples, the UE can flexibly place the data in any slot associated with a new transport block (TB). For example, retransmission data may not be moved. Thus, the flexibly determining the one or more transmission occasions may include determining any of the one or more transmission occasions that is associated with an initial transmission.

In some examples, the UE can place the high priority data in the earliest transmission occasion (e.g., according to the logical channel prioritization rules), but duplicates the high priority data across different HARQ processes of the grants. For example, the UE can send a repetition of the data in one of the other grants associated with a new TB. Thus, the flexibly determining the one or more transmission occasions can include determining an earliest one of the transmission occasions for transmitting highest priority data and determining another of the transmission occasions for transmitting a repetition of the highest priority data. In some examples, when a single DCI is used to schedule multiple physical uplink shared channel (PUSCH) transmissions, the UE is allowed to map generated transport block(s) internally to different HARQ processes in case of LBT failure(s). For example, the UE may transmit a new TB on any HARQ process in the grants that have the same transport block size (TBS), the same redundancy version (RV), and the new data indicators (NDIs) indicate new transmission.

Figure 6:
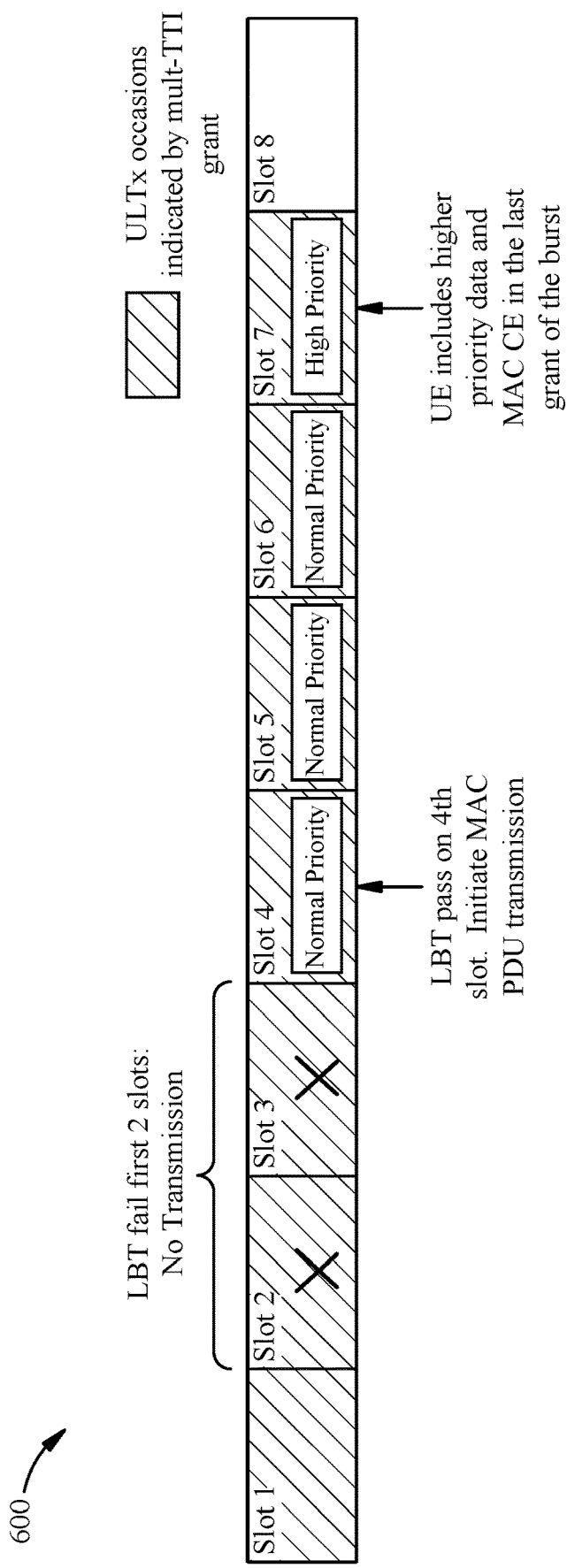
FIG. 6 is a block diagram illustrating example flexible data placement in an uplink burst, in accordance with certain aspects of the present disclosure.

In some examples, the UE can place data, such as the high priority data, starting at the last transmission occasion in the uplink burst or the last medium access control (MAC) protocol data unit (PDU) transmitted by UE in the uplink burst which is associated with a new TB. For example, the UE can place higher priority data in the later transmission occasions (e.g., if associated with a new transmission) of the uplink burst and low priority data within the earlier portion of uplink burst. In other words, the logical channel prioritization order to process grants may be reversed. Thus, the flexibly determining the one or more transmission occasions can include determining a last one of the plurality of transmission occasions for transmitting highest priority data. The flexibly determining the one or more transmission occasions can include determining the transmission occasions for transmitting the data in ascending order of priority. As shown in an illustrative example in FIG. 6, similar to the example shown in FIG. 4, the UE may be scheduled in slots 2-7 (e.g., by a multi-TTI grant scheduling uplink transmission occasions) and a LBT procedure may fail for slot 2 and slot 3, and the LBT may pass on slot 4. As shown in FIG. 6, the UE may place data (e.g., higher priority data and/or MAC CE data) in the last transmission occasion of the multi-TTI grant (e.g., slot 7) and may place the remaining data (e.g., the normal priority data) in the remaining slots (slots 4-6). Thus, as shown in FIG. 6, although the LBT procedure failed for the slots 2 and 3, the high priority data is still transmitted because the data was placed in the later transmission occasions.

Figure 7:
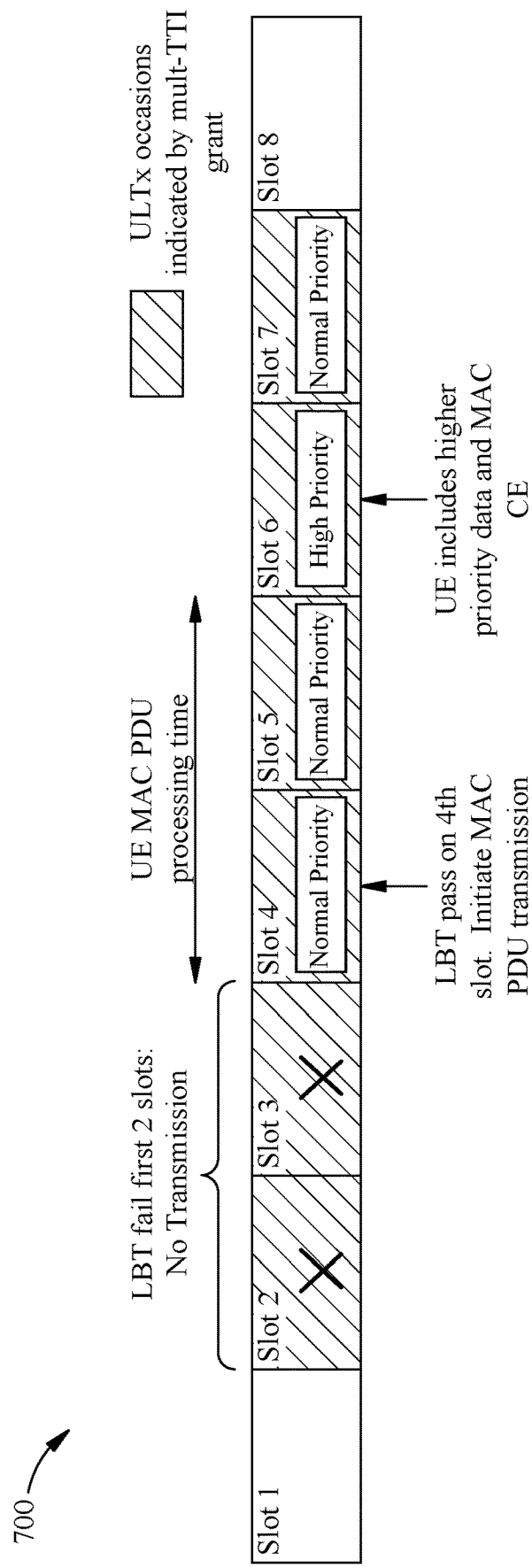
FIG. 7 is a block diagram illustrating example flexible data placement in an uplink burst, in accordance with certain aspects of the present disclosure.

In some examples, the UE can place data in a transmission occasion (e.g., if associated with new transmission) after the UE acquires the channel (e.g., after LBT success). The UE may also have a processing time (e.g., N transmission occasions or slots) to prepare the data (e.g., to prepare the MAC PDU) after acquiring the channel. The physical layer (PHY) at the UE can indicate in which transmission occasion the MAC layer at the UE should include a MAC CE. The PHY may indicate the transmission occasion where the channel is acquired (e.g., LBT succeeded). Thus, the flexibly determining the one or more transmission occasions can include determining an earliest one of the transmission occasions, after acquiring a channel, for transmitting data. The flexibly determining the one or more transmission occasions can include determining an earliest one of the transmission occasions, after acquiring a channel and after a processing time to prepare the data for transmission, for transmitting data. As shown in an illustrative example in FIG. 7, similar to the examples shown in FIG. 4 and FIG. 6, the UE may be scheduled in slots 2-7 (e.g., by a multi-TTI grant scheduling uplink transmission occasions) and a LBT procedure may fail for slot 2 and slot 3, and the LBT may pass on slot 4. In the example shown in FIG. 7, the UE may have a UE MAC PDU processing time of two slots. As shown in FIG. 7, the UE may place data (e.g., higher priority data and/or MAC CE data) in the first transmission occasion of the multi-TTI grant (e.g., slot 6) that occurs two slots (e.g., the MAC PDU processing time) after LBT procedure passes (in slot 4).

As mentioned above, in some cases, the uplink burst is scheduled when the UE is provided with multiple grants that schedule consecutive (e.g., contiguous/sequential/back-to-back) transmission occasions independently. For example, a DCI-1 may schedule slot-1, DCI-2 schedules slot-2, and DCI-3 schedules slot-3, such that UL grants are contiguous. However, in some cases the UE may have prepared the data (e.g., the MAC PDU) before it processes one or more (e.g., a subset) of the DCI/UL grants. For example, the UE may have prepared the MAC PDU after receiving DCI-1 and DCI-2, but after preparing the MAC PDU the UE processes DCI-3.

According to certain aspects, the UE may not consider (e.g., can ignore) uplink grants received after data preparation for including high priority data. In the above example, the UE only places high priority data based on grants received from DCI-1 and DCI-2, but will not consider the grant received from DCI-3 for placing the high priority data. Thus, the flexibly determining the one or more transmission occasions can include ignoring transmission occasions scheduled by the one or more of the DCI received after the data was prepared for transmission.

According to certain aspects, the UE can deconstruct the data (e.g., MAC PDU) already prepared and reconsider high priority data placement based on all the received grants. In the above example, after receiving DCI-3, the UE will deconstruct the MAC PDU prepared and will again prepare the MAC PDU with high priority data considering grants provided in DCI-1, DCI-2, DCI-3. This deconstruction may not be done if the UE has already gained access to channel and high priority data can be transmitted using the currently prepared MAC PDU. Thus, the flexibly determining the one or more transmission occasions can include deconstructing the prepared data and determining any of the transmission occasions scheduled by any of the DCI for transmission of the data.

In the case of a MAC CE, if the MAC CE is placed at a later transmission occasion in the uplink burst, the MAC CE contents should be prepared according to the transmission occasion used for MAC CE transmission. For example, the buffer status report should not report data corresponding to TBs which have been attempted at earlier transmission occasions of the uplink burst. Thus, a MAC CE transmitted in the determined transmission occasion may include a buffer status report excluding data that was attempted in an earlier of the transmission occasions.

According to certain aspects, the number of transmission occasions that transmission of the data (e.g., of high priority data) can be delayed may be restricted (e.g., capped/limited). For example, if five contiguous slots are available for UL transmission, then the UE may only be able to (e.g., may be restricted/limited to) insert (e.g., place) data up to slot-3. Delaying the data too long may decrease the quality-of-service (QoS). Thus, the UE may be configured with a maximum number of transmission occasions or slots or time duration that it can delay transmission of data with respect to an earliest of the transmission occasions. Such restriction can be imposed (e.g., configured or signaled) by network. In some examples, the BS can indicate to the UE how many slots can be delayed to transmit a MAC CE and/or a high priority logical channel data. In some examples, the UE decides on its own to limit the acceptable delay in transmission of the data.

In some cases, transmission occasions may be punctured. If the high priority data is placed in the earliest transmission occasion of the uplink burst, but the transmission occasion is punctured, then the network may not be able to successfully decode the data. Instead, the network may only be able to decode the data after the UE performs a HARQ retransmission, which can lead to delay for reception of the data.

According to certain aspects, if puncturing is performed on the transmission occasion where the UE performs transmission, then UE may not include the data (e.g., high priority data) in the punctured transmission occasion. Instead, the UE can include the data in one of later slots based on its processing timeline. Thus, determining the one or more transmission occasions can include ignoring the punctured transmission occasion for transmitting data. According to certain aspects, the UE can place the data in the punctured earliest transmission occasion (e.g., according to the logical channel prioritization rules) and repeat the data in another transmission occasion. This may be done for grants where the HARQ process ID selection is up to the UE. Thus, determining the one or more transmission occasions can include at least one punctured transmission occasion for transmitting data and determining another of the transmission occasions for transmitting a repetition of the data. In some examples, the UE may perform the above procedures—for placing the data in an unpunctured transmission occasion and/or for repeating the data in another transmission occasion—when a threshold number of symbols are punctured in the transmission occasion.

Figure 8:
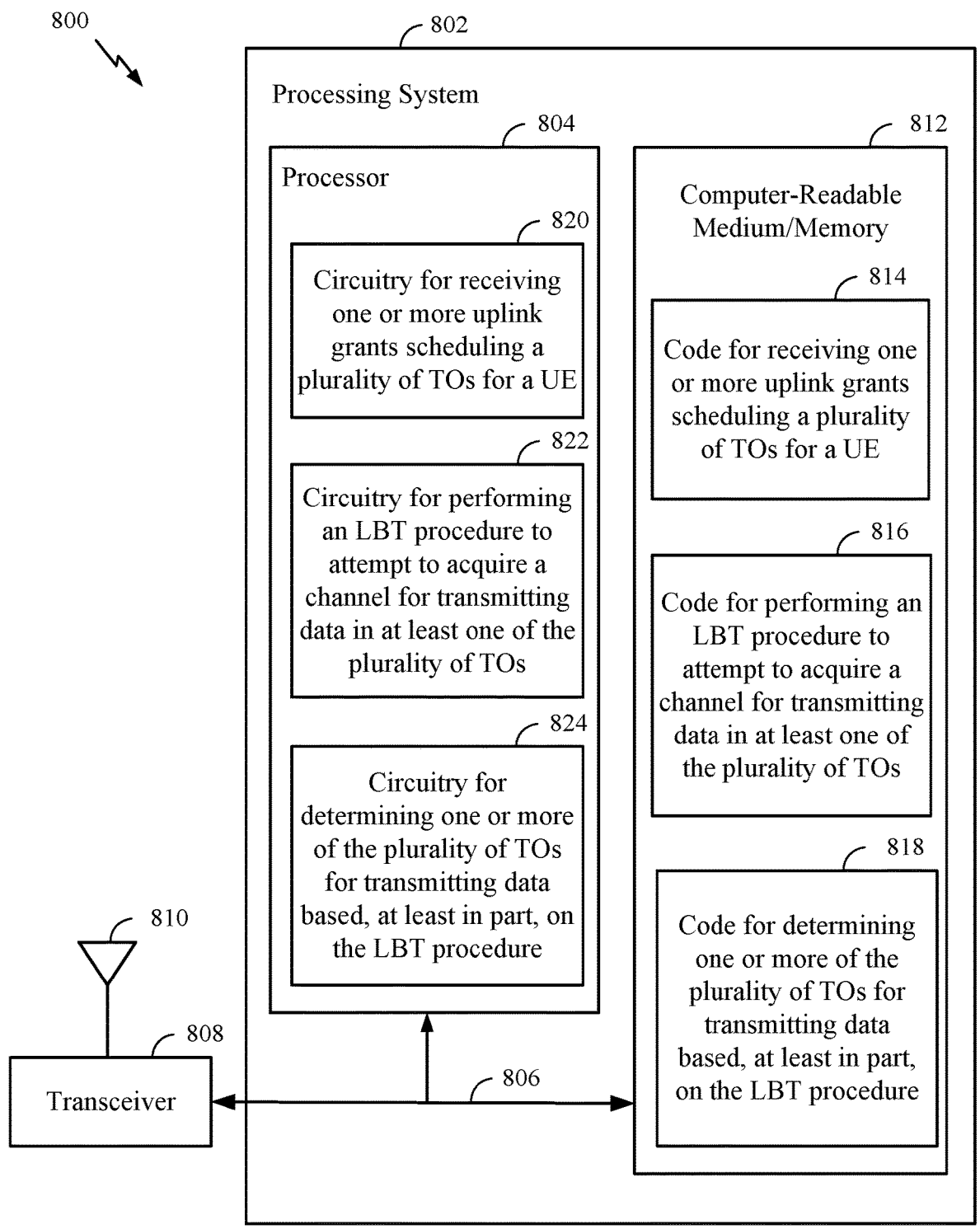
FIG. 8 illustrates a communications device that may include various components configured to perform operations for the techniques disclosed herein in accordance with certain aspects of the present disclosure.

FIG. 8 illustrates a communications device 800 that may include various components (e.g., corresponding to means-plus-function components) configured to perform operations for the techniques disclosed herein, such as the operations illustrated in FIG. 5. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 5, or other operations for performing the various techniques discussed herein for data scheduling in uplink bursts. In certain aspects, computer-readable medium/memory 812 stores code 814 for receiving one or more uplink grants scheduling a plurality of transmission occasions for the UE; code 616 for performing a LBT procedure to attempt to acquire a channel for transmitting data in at least one of the plurality of transmission occasions; and code 618 for determining one or more of the plurality of transmission occasions to transmit data based, at least in part, on the LBT procedure, in accordance with aspects of the present disclosure. In certain aspects, the processor 804 has circuitry configured to implement the code stored in the computer-readable medium/memory 812. The processor 804 includes circuitry 818 for receiving one or more uplink grants scheduling a plurality of transmission occasions for the UE; circuitry 622 for performing a LBT procedure to attempt to acquire a channel for transmitting data in at least one of the plurality of transmission occasions; and circuitry 624 for determining one or more of the plurality of transmission occasions to transmit data based, at least in part, on the LBT procedure, in accordance with aspects of the present disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving one or more uplink grants scheduling a plurality of transmission occasions for the UE, wherein the plurality of transmission occasions includes a first transmission occasion and one or more later transmission occasions occurring after the first transmission occasion;
identifying data as high priority data;
determining, before performing a listen-before-talk (LBT) procedure to attempt to acquire a channel for transmitting the high priority data in the first transmission occasion, to transmit the high priority data in a transmission occasion of the one or more later transmission occasions associated with at least one grant of the one or more uplink grants without attempting to transmit the high priority data in the first transmission occasion, wherein the at least one grant has a same transport block size (TBS) and redundancy version (RV) for the transmission occasion as a TBS and RV for the first transmission occasion and has a new data indicator (NDI) that indicates a new transmission; and
attempting to transmit the high priority data in the transmission occasion of the one or more later transmission occasions.

2. The method of claim 1, wherein at least one of the one or more uplink grants is a multiple transmission time interval (multi-TTI) uplink grant that schedules multiple consecutive transmission occasions including the plurality of transmission occasions.

3. The method of claim 1, wherein the high priority data comprises at least one of: a medium access control control element (MAC CE) or data having a highest priority according to a logical channel prioritization (LCP) procedure.

4. The method of claim 1, wherein the high priority data comprises ultra-reliable low-latency data.

5. The method of claim 1, further comprising determining another transmission occasion of the plurality of transmission occasions to transmit a repetition of the high priority data.

6. The method of claim 1, wherein the determining to transmit the high priority data in the transmission occasion of the one or more later transmission occasion comprises determining to transmit the high priority data in a last transmission occasion of the plurality of transmission occasions.

7. The method of claim 1, wherein the determining to transmit the high priority data in the transmission occasion of the one or more later transmission occasions comprises determining transmission occasions to transmit data in ascending order of a priority of the data, wherein lower priority data is transmitted in earlier transmission occasions than higher priority data.

8. The method of claim 1, wherein the determining to transmit the high priority data in the transmission occasion of the one or more later transmission occasions comprises determining to transmit the high priority data in an earliest transmission occasion of the one or more later transmission occasions occurring after acquiring a channel to transmit the data.

9. The method of claim 1, wherein the determining to transmit the high priority in the transmission occasion of the one or more later transmission occasions comprises determining to transmit the high priority data in an earliest transmission occasion of the one or more later transmission occasions occurring after a processing time, after acquiring a channel, to prepare the high priority data for transmission.

10. The method of claim 1, wherein:
the one or more uplink grants are each provided in a separate downlink control information (DCI) of one or more DCIs; and
at least one DCI of the one or more of the DCIs is received after preparing the high priority data for transmission.

11. The method of claim 10, further comprising ignoring transmission occasions scheduled by the at least one DCI received after the high priority data was prepared for transmission.

12. The method of claim 10, further comprising deconstructing the prepared high priority data, wherein the determining to transmit the high priority data in the transmission occasion of the one or more later transmission occasions comprises selecting any of the one or more later transmission occasions to transmit the high priority data.

13. The method of claim 1, further comprising transmitting a buffer status report in the transmission occasion of the one or more later transmission occasions, wherein the buffer status report excludes data that was attempted in an earlier transmission occasion of the plurality of transmission occasions.

14. The method of claim 1, wherein the UE is configured with a maximum delay for transmitting the high priority data, wherein the maximum delay comprises a maximum number of transmission occasions, starting from an earliest transmission occasion of the plurality of transmission occasions, and wherein the determining to transmit the high priority data in the transmission occasion of the one or more later transmission occasions comprises selecting a transmission occasion of the one or more later transmission occasions occurring within the maximum delay.

15. The method of claim 1, wherein:
at least one transmission occasion of the plurality of transmission occasions is punctured; and
the method further comprises ignoring the at least one transmission occasion for transmitting the high priority data.

16. The method of claim 1, wherein the determining to transmit the high priority data in the transmission occasion of the one or more later transmission occasions comprises selecting at least one punctured transmission occasion of the one or more later transmission occasions to transmit the high priority data.

17. An apparatus for wireless communication, comprising:
one or more memories comprising computer executable code; and
one or more processors configured to, individually or collectively, execute the at least one processor to computer executable code and cause the apparatus to:
receive one or more uplink grants scheduling a plurality of transmission occasions for the apparatus, wherein the plurality of transmission occasions includes a first transmission occasion and one or more later transmission occasions after the first transmission occasion;
identify data as high priority data;
determine, before performing a listen-before-talk (LBT) procedure to attempt to acquire a channel for transmitting the high priority data in the first transmission occasion to transmit the high priority data in a transmission occasion of the one or more later transmission occasions associated with at least one grant of the one or more uplink grants without attempting to transmit the high priority data in the first transmission occasion, wherein the at least one grant has a same transport block size (TBS) and redundancy version (RV) for the transmission occasion as a TBS and RV for the first transmission occasion and has a new data indicator (NDI) that indicates a new transmission; and
attempt to transmit the high priority data in the transmission occasion of the one or more later transmission occasions.

18. The apparatus of claim 17, wherein at least one of the one or more uplink grants is a multiple transmission time interval (multi-TTI) uplink grant that schedules multiple consecutive transmission occasions including the plurality of transmission occasions.

19. The apparatus of claim 17, wherein the high priority data comprises at least one of: a medium access control control element (MAC CE) or data having a highest priority according to a logical channel prioritization (LCP) procedure.

20. The apparatus of claim 17, wherein the high priority data comprises ultra-reliable low-latency data.

21. The apparatus of claim 17, wherein the one or more processors are configured to, individually or collectively, cause the apparatus to determine another of the plurality of transmission occasions to transmit a repetition of the high priority data.

22. The apparatus of claim 17, wherein the one or more processors are configured, individually or collectively, to cause the apparatus to determine a last one of the plurality of transmission occasions to transmit the high priority data.

23. An apparatus for wireless communication, comprising:
means for receiving one or more uplink grants scheduling a plurality of transmission occasions for the apparatus, wherein the plurality of transmission occasions includes a first transmission occasion and one or more later transmission occasions after the first transmission occasion;
means for identifying data as high priority data;
means for determining, before performing a listen-before-talk (LBT) procedure to attempt to acquire a channel for transmitting the high priority data in the first transmission occasion, to transmit the high priority data in a transmission occasion of the one or more later transmission occasions associated with at least one grant of the one or more uplink grants without attempting to transmit the high priority data in the first transmission occasion, wherein the at least one grant has a same transport block size (TBS) and redundancy version (RV) for the transmission occasion as a TBS and RV for the first transmission occasion and has a new data indicator (NDI) that indicates a new transmission; and
means for attempting to transmit the high priority data in the transmission occasion of the one or more later transmission occasions.

24. A non-transitory computer readable medium storing computer executable code thereon, comprising:

code for receiving one or more uplink grants scheduling a plurality of transmission occasions for a user equipment (UE), wherein the plurality of transmission occasions includes a first transmission occasion and one or more later transmission occasions after the first transmission occasion;

code for identifying data as high priority data;

code for determining, before performing a listen-before-talk (LBT) procedure to attempt to acquire a channel for transmitting the high priority data in the first transmission occasion, to transmit the high priority data in a transmission occasion of the one or more later transmission occasions associated with at least one grant of the one or more uplink grants without attempting to transmit the high priority data in the first transmission occasion, wherein the at least one grant has a same transport block size (TBS) and redundancy version (RV) for the transmission occasion as a TBS and RV for the first transmission occasion and has a new data indicator (NDI) that indicates a new transmission; and code for attempting to transmit the high priority data in the transmission occasion of the one or more later transmission occasions.

\* \* \* \* \*